United States Patent
Ballikaya

(10) Patent No.: US 12,269,203 B2
(45) Date of Patent: Apr. 8, 2025

(54) ARRANGEMENT AND METHOD FOR MENDING A PIPE, PARTICULARLY A WASTE WATER PIPE

(71) Applicants: GLOBAL SAFETY TEXTILES GMBH, Bad Säckingen (DE); SWISSINLINER GMBH, Cham (CH)

(72) Inventor: Ergül Ballikaya, Lucerne (CH)

(73) Assignee: GLOBAL SAFETY TEXTILES GMBH, Bad Säckingen (DE)

( * ) Notice: Subject to any disclaimer, the term of this patent is extended or adjusted under 35 U.S.C. 154(b) by 276 days.

(21) Appl. No.: 17/595,737

(22) PCT Filed: May 7, 2020

(86) PCT No.: PCT/EP2020/062729
§ 371 (c)(1),
(2) Date: Nov. 23, 2021

(87) PCT Pub. No.: WO2020/244883
PCT Pub. Date: Dec. 10, 2020

(65) Prior Publication Data
US 2022/0219379 A1    Jul. 14, 2022

(30) Foreign Application Priority Data
Jun. 7, 2019    (DE) ............. 10 2019 115 556.8

(51) Int. Cl.
*B32B 41/00*    (2006.01)
*B29C 63/20*    (2006.01)
(Continued)

(52) U.S. Cl.
CPC ............... *B29C 63/20* (2013.01); *B32B 1/08* (2013.01); *B32B 5/022* (2013.01); *B32B 5/024* (2013.01);
(Continued)

(58) Field of Classification Search
CPC .......... B29C 63/20; B32B 1/08; B32B 5/022; B32B 5/024; B32B 5/26; B32B 2260/021;
(Continued)

(56) References Cited

U.S. PATENT DOCUMENTS

| 5,501,248 A | 3/1996 | Kiest, Jr. |
| 5,855,729 A | 1/1999 | Kiest, Jr. et al. |

(Continued)

FOREIGN PATENT DOCUMENTS

| DE | 19718655 A1 | 11/1998 |
| DE | 69727295 T2 | 11/2004 |

(Continued)

OTHER PUBLICATIONS

Search Report and Written Opinion for International Application No. PCT/EP2020/062729 mailed Aug. 5, 2020.

*Primary Examiner* — Michael N Orlando
*Assistant Examiner* — Joshel Rivera
(74) *Attorney, Agent, or Firm* — Chrisman Gallo Tochtrop LLC

(57) ABSTRACT

An arrangement for mending a pipe, particularly a waste water pipe, which arrangement comprises the following elements: a first textile hose (ALg) woven in a single piece preferably laminated on the outer wall thereof, a felt hose (FS) arranged in the interior of the first textile hose (ALg) and wetted with a curable synthetic resin mixture, and a second textile hose (ALs), woven in a single piece and coated on its outer wall with a release agent, preferably silicon, not adhering to the synthetic resin mixture, for introduction into the felt hose (FS). A method for mending a pipe, particularly a waste water pipe, preferably uses the arrangement described.

6 Claims, 2 Drawing Sheets

(51) Int. Cl.
*B32B 1/08* (2006.01)
*B32B 5/02* (2006.01)
*B32B 5/26* (2006.01)
*F16L 55/165* (2006.01)

(52) U.S. Cl.
CPC ............ *B32B 5/26* (2013.01); *F16L 55/1651* (2013.01); *F16L 55/1654* (2013.01); *F16L 55/1656* (2013.01); *B32B 2260/021* (2013.01); *B32B 2260/046* (2013.01); *B32B 2597/00* (2013.01)

(58) Field of Classification Search
CPC .......... B32B 2260/046; B32B 2597/00; B32B 2250/03; F16L 55/1651; F16L 55/1654; F16L 55/1656
USPC .................... 156/60, 64, 350, 351, 378, 379
See application file for complete search history.

(56) References Cited

U.S. PATENT DOCUMENTS

| | | | |
|---|---|---|---|
| 6,170,531 | B1 | 1/2001 | Jung et al. |
| 2006/0070676 | A1 | 4/2006 | Blackmore |
| 2006/0278290 | A1* | 12/2006 | Warren ............... F16L 55/1654 138/137 |
| 2013/0098535 | A1 | 4/2013 | Kiest, Jr. |

FOREIGN PATENT DOCUMENTS

| | | | |
|---|---|---|---|
| EP | 1426671 | A1 | 6/2004 |
| EP | 3137804 | B1 | 6/2018 |

* cited by examiner

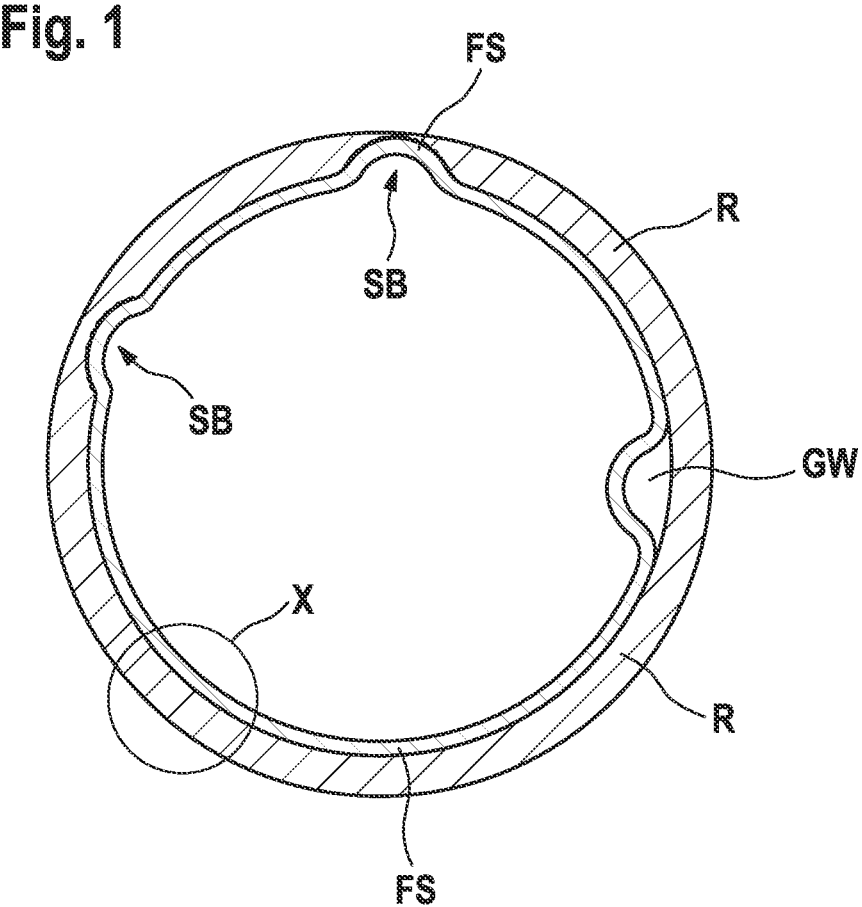
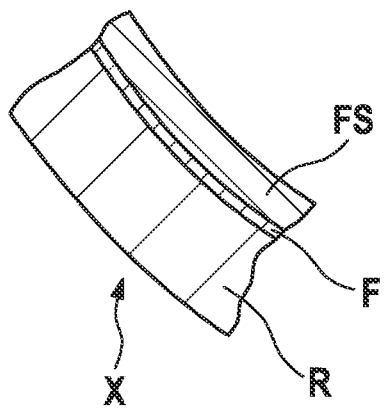

ARRANGEMENT AND METHOD FOR MENDING A PIPE, PARTICULARLY A WASTE WATER PIPE

This is a National Stage application of PCT international application PCT/EP2020/062729, filed on May 7, 2020 which claims the priority of German Patent Application No. 10 2019 115 556.8, filed Jun. 7, 2019, both of which are incorporated herein by reference in their entirety.

The present invention relates to an arrangement and method for mending a pipe, particularly a waste water pipe.

Mending or replacing damaged water or waste water pipes laid underground is a very costly and time-consuming matter. In the case of pipes laid under roadways, traffic on the surface is usually severely disrupted. Some pipes, however, are no longer accessible at all from above due to building developments. In this case, complete reconstruction on another pipe route would also be a very expensive alternative. As a result of these difficulties, methods have been developed which avoid replacing the pipes and instead seal the damaged inner wall of the pipe by pulling in and applying a liner, such as a hose, to the inner wall of the pipe. A slight loss of cross-section is accepted in this case.

EP 3 137 804 B1 discloses a liner for mending partially damaged or obsolete pipes for drinking water or waste water as well as a method for producing such a liner. The knitted hose material used in this process has neither radial nor axial strength and therefore, when installed in a generally defective pipe, "copies" its damaged contour and lies against its inner wall, also copying indentations for example. During mending, this may lead to the formation of new blockages and cavities which in turn have the disadvantage of creating new sources of blockages and leaks in the pipe.

In a conventional method for mending a waste water pipe, a felt hose is introduced in what is known as the inversion method. In this method, a sliding sheet or a film tube (preliner) is first pulled into the pipe to be mended as what is known as permanent formwork and then a felt hose (main liner) is pulled in as the carrier hose, together with a calibration hose. Neither the preliner nor the main liner, however, can absorb radial or axial forces due their material characteristics (unreinforced plastic film and felt fabric). The combination of main liner and calibration hose is limited in absorbing axial forces. The conventional preliner is impermeable to air due to its material structure. All components are installed one after the other in the inversion method. In this case, pulling-in takes place from maintenance shaft to maintenance shaft or from a maintenance shaft towards a "blind" end (i.e. installation in a pipe end without access, known as the open-end method). After installation, pressure up to around 0.8 bar is admitted to the system and it is expanded at the same time. Following this, the synthetic resin contained in the main liner is cured. This system also has the disadvantage of copying the damaged contour of the inner wall of the pipe to be mended, with the adverse consequences described above. As the system can absorb hardly any axial forces, it copies irregular cross-sections of the old pipe. The felt hose follows the shape of the old pipe with all its deformities.

Another known method, known as the hybrid liner method, uses a hybrid liner which is a factory-produced felt hose reinforced with glass-fibre mats. The hybrid liner is pulled into a reinforced preliner (film tube) which is constructed to be impermeable to light and air. Preliner and hybrid liner are then pulled into the damaged pipe with the calibration hose. The hybrid liner is supplied or soaked with resin locally on the construction site. The arrangement is pulled in from manhole to manhole and expanded radially with the help of the calibration hose. Following this, the synthetic resin present in the main liner is cured.

After curing, the said hybrid liner has much higher resistance than a simple felt hose due to the integrated fibreglass reinforcement with a higher modulus of elasticity and higher bending tensile strength. However, the inversion method is not possible here due to the stiffness of the integrated glass-fibre mats. The hybrid liner can only be installed in a pipeline by pulling it in without kinks and has very limited bend mobility due to the limited flexibility of the glass fibres. This makes its installation, which is also only possible between easily accessible maintenance shafts, more complex and more costly.

It is thus an object of the invention to propose an arrangement and a method which now avoids or at least greatly diminishes the known disadvantages in prior art.

The object is initially achieved by an arrangement for mending a pipe, particularly a waste water pipe, according to claim 1, namely an arrangement for mending a pipe, particularly a waste water pipe, comprising the following elements:
  a) a first textile hose, woven in a single piece and laminated on the outer wall thereof,
  b) a felt hose arranged in the interior of the first textile hose and wetted with a curable synthetic resin mixture, and
  c) a second textile hose, woven in a single piece and coated on its outer wall with a release agent, preferably silicone, not adhering to the synthetic resin mixture, for introduction into the felt hose.

With the new arrangement according to the invention, it is advantageously possible to produce a stable inner liner for pipes that can also be installed in pipelines with many bends up to 90° which is not possible with prior art devices. The embodiment of the first hose as a textile hose woven in a single piece, known as OPW hose (one-piece-woven) has the great advantage that it does not have any seams that are relatively bulky, as is the case with prior art hoses used. This allows easier handling, even in bends, and substantially finer contour guidance in the pipe to be mended. This also reduces the inner lumen less than with hoses known in prior art. In addition, it is substantially easier to accomplish inversion. Since the second hose, which has the function of a calibration hose, is also executed as an OPW hose, it can also follow the fine contour of the first hose. The result, among other things, is a sleeker contour of the inner wall. Furthermore, using a second textile hose coated with silicone advantageously results in a very smooth inner surface in the mended pipe.

In an advantageous embodiment of the invention, the arrangement is characterised in that the second textile hose advantageously has a device in its interior for introducing heat, steam and/or light. This allows the type of curing of the curable synthetic resin mixture on or in the felt hose to be freely selected as well as combined. The range of possible curing methods is increased and allows for an individual approach depending on the requirements of the conditions at the particular construction site. The object is further achieved by a method according to claim 3, preferably using an arrangement according to claim 1 or 2, namely a method for mending a pipe, particularly a waste water pipe, comprising the following steps:
  a) introducing a first textile hose, woven in a single piece and preferably laminated on the outer wall thereof, into the pipe, particularly the waste water pipe, b) introducing a felt hose arranged in the interior of the first textile hose and wetted with a curable synthetic resin mixture, c) introducing a second textile hose, woven in a single piece and coated on its outer wall with a release agent, preferably silicone, not adhering to the synthetic resin mixture, into the interior of the felt hose, d) substantially airtight sealing of the second textile hose, e) inflating the second textile hose, f) pressing the second textile hose, the felt hose and the first textile hose radially against the pipe, particularly the waste water pipe, for a predetermined length of time, g) leaving the curable synthetic resin mixture to cure, h) removing the second textile hose from inside the felt hose.

The new method according to the invention facilitates substantially faster and more cost-effective mending of damaged pipes. In addition, it is possible to create substantially more durable and more resistant new liners of pipes than is possible with methods known in prior art. The hoses produced using the OPW technique can be used to rehabilitate sewers with higher static loads in both the radial and axial direction. In the axial direction, the OPW fabric of the textile hoses according to the invention permits considerably higher tensile stress as well as a substantially higher dynamic load during installation than with conventional solutions. Using a second textile hose coated with silicone advantageously results in a very smooth inner surface in the mended pipe.

In an advantageous embodiment of the invention, the method is characterised in that the step b) is carried out in such a manner that a felt hose wetted on its inner wall with a curable synthetic resin mixture is turned inside out when it is introduced into the interior of the first textile hose in such a manner that its inner wall faces outwards towards the first textile hose after being turned inside out. In accordance with the method according to the invention, the arrangement can be installed using the pull-in method and in bent pipes using the inversion method. Blind connections can also be installed with the method according to the invention. The method may also be used for pipes where only one-sided access is possible at the time of installation (open-end technique).

In a further advantageous embodiment of the invention, the method is characterised in that heat, steam or light is admitted to the interior of the second textile hose during steps f) and g). With an airtight-sealed second textile hose, curing of the synthetic resin mixture can be advantageously supported and accelerated via a heat, steam or light source arranged therein.

In yet another advantageous embodiment of the invention, the method used is that in step e) the second textile hose is inflated to a pressure of up to 4 bar, the first textile hose being pressed firmly against the pipe, particularly the waste water pipe. This particularly advantageous procedure according to the invention enables the production of almost perfect pipe liners which are exceptionally tight. In this process step, the first textile hose is already so pressurised that no groundwater or the like can enter the liner from the outside until the synthetic resin has cured.

It can also be used to solve the problem of water ingress. On the one hand, preliners of conventional systems, which are usually film tubes, do not bond either to the felt hose (carrier hose) wetted with a curable synthetic resin mixture or to the old pipe. For this reason, penetrating water can get into their interstitial space. On the other hand, if the outer skin of the new carrier hose is drilled into when side connections (sockets) are opened in the sewer system, this leads to waste water being able to enter the cavity between the carrier hose and the old pipe, which is created by the conventional preliner, and behind the carrier hose, and can escape via the old pipe.

Likewise, groundwater also flows into the sewer system by this route. All of this can be prevented with the method according to the invention.

Further advantages of the invention are found in the following description.

To facilitate better understanding of the invention, it will now be briefly described by way of an example embodiment with the aid of a drawing, in which:

FIG. 1 shows a greatly simplified diagrammatic sectional view of a sewer pipe/waste water pipe with shard fracture and waste water ingress and liner installed according to prior art.

FIG. 1a shows a greatly simplified diagrammatic view of a greatly enlarged detail X from FIG. 1.

Figure 2:
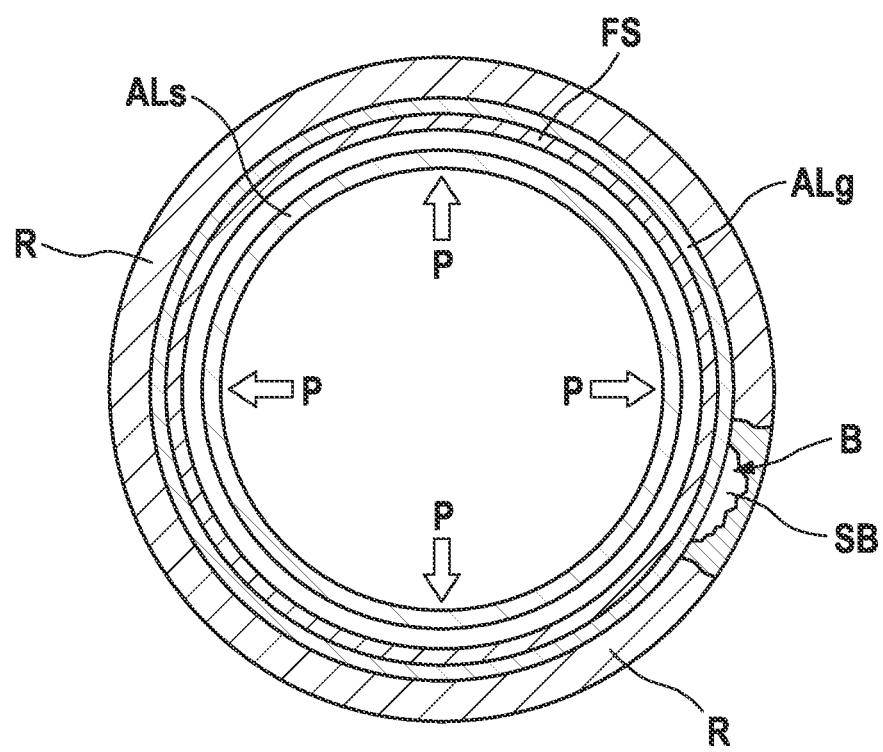
FIG. 2 shows a greatly simplified view of an arrangement according to the invention, with a first textile hose inserted into a pipe, with a felt hose wetted with a curable synthetic resin mixture and a second textile hose as a calibration hose, introduced into the felt hose.

The dimensional ratios of thickness to diameter are extremely exaggerated in the drawing to facilitate better understanding. Reference is sometimes made in the following to a pipe, a waste water pipe or a drinking water pipe. As far as the invention is concerned, there is no difference here. As a rule, the pipes in question are clay, ceramic or concrete pipes, vitrified clay and the like that are to be mended. In the following description, components or elements that correspond to each other are labelled with the same reference numbers for the sake of simplicity.

FIG. 1 shows a pipe R which has been mended using a conventional method known in prior art. A felt hose FS soaked with synthetic resin, which is sewn or glued together from a longitudinal material, is arranged inside the pipe R. Present-day hoses are sewn or glued together from flat mats and produced as a hose with a longitudinal seam. For this reason, no higher pressures can be accommodated. The felt hose FS is expanded with a calibration hose common today. It presses the felt hose FS together with the preliner F against the pipe to be mended. It is not usually light-permeable and can only withstand pressures of up to 0.8 bar. It can tear along its entire length under higher pressure.

As shown in FIG. 1, in regions SB where the pipe is damaged by what is known as a shard fracture, the felt hose FS rests against the pipe following the contour of the fracture. The felt hose FS has "copied" the contour of the damaged pipe during installation. At the point marked GW, groundwater, which usually pushes into the pipe at about 0.8 bar, has penetrated through a porosity present in the pipe or a leak and is forcing the felt hose, which was expanded with around 0.6 bar during installation, inwards. Of course, in reality, the radially extending regions SB and GW shown here by way of example also extend axially in the pipe. The felt hose FS collapses into the cavities if there are defects in the old pipe. It expends during installation and, as it is not shape-retaining, it does not deform in a circular manner. As a result, the wall thickness in the felt hose is very uneven; too thick in the base region and too thin in the crown region. The restoration is usually leaky. The preliners of conventional sewer rehabilitation do not unite with or bond to the felt hose or the old pipe. The damaged regions SB and GW, which persist even after mending, represent deficiencies that arise with current sewer mending measures.

FIG. 1a shows the detail "X" from FIG. 1 enlarged several times. This shows a plastic film F, which is arranged directly against the inner wall of the pipe outside the felt hose FS and is intended to seal the felt hose against the pipe.

At the beginning of sewer rehabilitation in existing defective sewers, concrete pipes, vitrified clay pipes, etc., they are scanned in advance with a camera to identify damage and determine the exact length of the section to be repaired, for example between two manholes. Then the lengths of material to be introduced into the relevant pipe are correspondingly cut to length.

FIG. 2 shows an example of a pipe R to be mended with wall damage indicated on the right-hand side, in this case an internal wall rupture SB. In the situation shown, one can see, for instance, the condition after mending work is complete. First, a flexible and unbreakable first textile hose ALg, woven in a single piece and laminated on its outer wall (preferably with PET material), had been introduced into the empty pipe. This had created a dry environment for the components to be installed subsequently. Then a felt hose (FS), which had first been filled, outside the pipe R to be mended, with a synthetic resin on its inside, was introduced into the interior of the first textile hose ALg using the inversion method known to the person skilled in the art. In the process, the initially inner side of the felt hose FS came to the outside such that the side wetted with synthetic resin was then on the outside and directed towards the first textile hose ALg. Subsequently, a calibration hose ALs, that is a second textile hose, woven in a single piece and coated on its outer wall with silicone, was introduced into the interior of the felt hose FS. Following this, the calibration hose ALs was sealed at both ends, inflated and pressurised up to 4 to 5 bar. The first textile hose ALg was penetrated by the synthetic resin and took on additional reinforcing functions. The felt hose FS and also the first textile hose ALg were pressed radially against the inner wall of the pipe (arrows P) for a predetermined length of time (about four hours). First of all, any air and/or fluid inclusions both in the felt hose FS and also between the felt hose FS and the first textile hose ALg were pressed out radially outwards. Then the synthetic resin located between the felt hose FS and the first textile hose ALg cures and creates a hard liner. Curing can be promoted and accelerated by introducing heat, steam and/or light, preferably UV light, with which the synthetic resin reacts. If it is intended to use light, the second textile hose is made light-permeable during its production. This will not be discussed in detail here as the person skilled in the art has the knowledge required for this.

As the first textile hose ALg, which as an OPW hose is substantially stable in shape, is adapted in advance to the internal dimensions of the pipe to be mended, it retains its radial and axial dimensions and does not—as happens as standard in methods known from prior art—settle into the recess of the indentation SB, but "bridges" it, thus achieving a smooth inner pipe wall (reference letter "B"). Here in FIG. 2, the calibration hose ALs is shown relieved of pressure again so that a gap shows between the felt hose FS and the calibration hose ALs.

Investigations have shown that the procedure according to the invention results in a liner for pipes that is more resistant to chemical influences than common products already on the market. In addition, the liner created according to the invention is many times more resistant to mechanical loads and weathering effects acting from the outside than products used previously.

By bonding the felt hose FS to the first textile hose ALg, the latter is joined so tightly to the felt hose FS that the previously observed evasion due to fluttering is prevented. Thus, when robots are used to open the newly created liner in lateral pipe outlets or inlets (known as sockets) in the sewer, the sockets can be opened without damaging them.

By comparison: conventionally used preliners are not air-permeable. Air trapped between the felt hose and the preliner cannot escape radially and air voids form in the resin. To remove the trapped air from the system, in the past the preliner film has been slit with a knife. However, this is only possible in those regions where there is access to the hose (i.e. only in the manholes). Thus, a lot of air remains in the felt hose in other places.

During expansion by means of pressure according to the invention, the first textile hose ALg is wetted with resin and penetrated. The resistance of the first textile hose ALg is high enough to reliably prevent resin from penetrating into sleeves and holes. A resin film which bonds to the old pipe forms on the outer wall of the first textile hose ALg. Any gas or liquid inclusions present can be forced radially outwards to the pipe, particularly the waste water pipe, through pores created in the laminate of the first textile hose under the compressive load. This solves the problem of "water ingress" (see above) during rehabilitation if a textile hose is used as a preliner. (The use of preliners is generally mandatory, see ATV guidelines in Germany or VSA QUIK in Switzerland).

Any beads of air, gas or fluid located between the first textile hose ALg and the felt hose FS are forced out by the first textile hose ALg which is permeable to air under pressure such that the combination of the felt hose FS and the first textile hose ALg results in an air-free or gas-free liner.

The first textile hose ALg additionally serves, as already explained in greater detail above, as expansion protection because it prevents the felt hose from expanding and over-expanding (e.g. in the region of defects in the pipe). This prevents the felt hose FS from bursting. The cross-sectional area of the system newly created according to the invention remains almost constant over the length of the pipe. This ensures that the radial wall thickness of the felt hose or carrier hose also remains substantially almost the same over the installation length. This means that the expansion protection also guarantees that the wall thickness of the carrier hose is uniformly retained in the radius.

The invention claimed is:

1. Arrangement for mending a pipe, comprising the following elements:
    a) a first textile hose,
    b) a felt hose arranged in the interior of the first textile hose and wetted with a curable synthetic resin mixture, and
    c) a second textile hose, coated on its outer wall with a release agent, not adhering to the synthetic resin mixture, for introduction into the felt hose,
    wherein the first textile hose and second textile hose each comprise a one-piece woven textile hose.

2. Arrangement according to claim 1, wherein the second textile hose has a device in its interior for introducing heat, steam or light.

3. Method for mending a pipe, comprising the following steps:
    a) introducing a first textile hose, laminated on the outer wall thereof, into the pipe,
    b) introducing a felt hose wetted with a curable synthetic resin mixture into the interior of the first textile hose, c) introducing a second textile hose, coated on its outer wall with a release agent, not adhering to the synthetic resin mixture, into the interior of the felt hose,
d) substantially airtight sealing of the second textile hose,
e) inflating the second textile hose,
f) pressing the second textile hose, the felt hose and the first textile hose radially against the pipe, for a predetermined length of time,
g) leaving the curable synthetic resin mixture to cure, and
h) removing the second textile hose from inside the felt hose,
wherein the first textile hose and second textile hose each comprise a one-piece woven textile hose.

4. Method according to claim 3, wherein the step b) is carried out in such a manner that a felt hose wetted on its inner wall with a curable synthetic resin mixture is turned inside out when it is introduced into the interior of the first textile hose in such a manner that its inner wall faces outwards towards the first textile hose after being turned inside out.

5. Method according to claim 3, wherein heat, steam or light is admitted to the interior of the second textile hose during steps f) and g).

6. Method according to claim 3, wherein in step e) the second textile hose is inflated to a pressure of up to 4 bar, the first textile hose being pressed firmly against the pipe.

* * * * *